United States Patent [19]

Thomas et al.

[11] 4,312,521
[45] Jan. 26, 1982

[54] SAFETY BELT RETRACTOR ASSEMBLY UTILIZING VEHICLE STRUCTURE

[75] Inventors: Rudy V. Thomas, Sterling Heights; David A. Pickett, Warren, both of Mich.; Terry R. Harrell, Lima, Ohio

[73] Assignee: Allied Corporation, Morris Township, Morris County, N.J.

[21] Appl. No.: 127,666

[22] Filed: Mar. 6, 1980

[51] Int. Cl.³ .............................................. B60R 21/10
[52] U.S. Cl. ............................ 280/806; 242/107.4 A; 280/807; 297/478
[58] Field of Search ............... 280/801, 802, 803, 805, 280/806, 807, 808, 749; 297/475, 476, 477, 478, 479, 480; 242/107.1, 107.4 A, 55.2, 86.52, 86.5 R, 107.4 R; 296/142, 143

[56] References Cited

U.S. PATENT DOCUMENTS 1,280,272 10/1918 Montroy .......................... 296/142 X
4,149,737 4/1979 Magyar ............................... 280/807
4,167,277 9/1979 Rumpf .................................. 280/807

Primary Examiner—John A. Pekar
Attorney, Agent, or Firm—Roger H. Criss

[57] ABSTRACT

An improved safety belt retractor assembly is provided wherein the support shaft for the retractor spool having a belt wound thereon is directly mounted on a pair of integral raised flanges on a vehicle structural support member. The ends of the shaft engage the flange by a J-shaped anchor and the load caused by the restraining force of the belt is thus transmitted directly to the structural support member. In addition, the lock dog is directly supported in a V-shaped cutout for direct transmission of the force to the structural support. A plastic cover having openings in the sides locate the ends of the shaft and the lock dog during pre-assembly. A cross-piece for the pendulum actuator is also pre-located in the cover.

14 Claims, 6 Drawing Figures

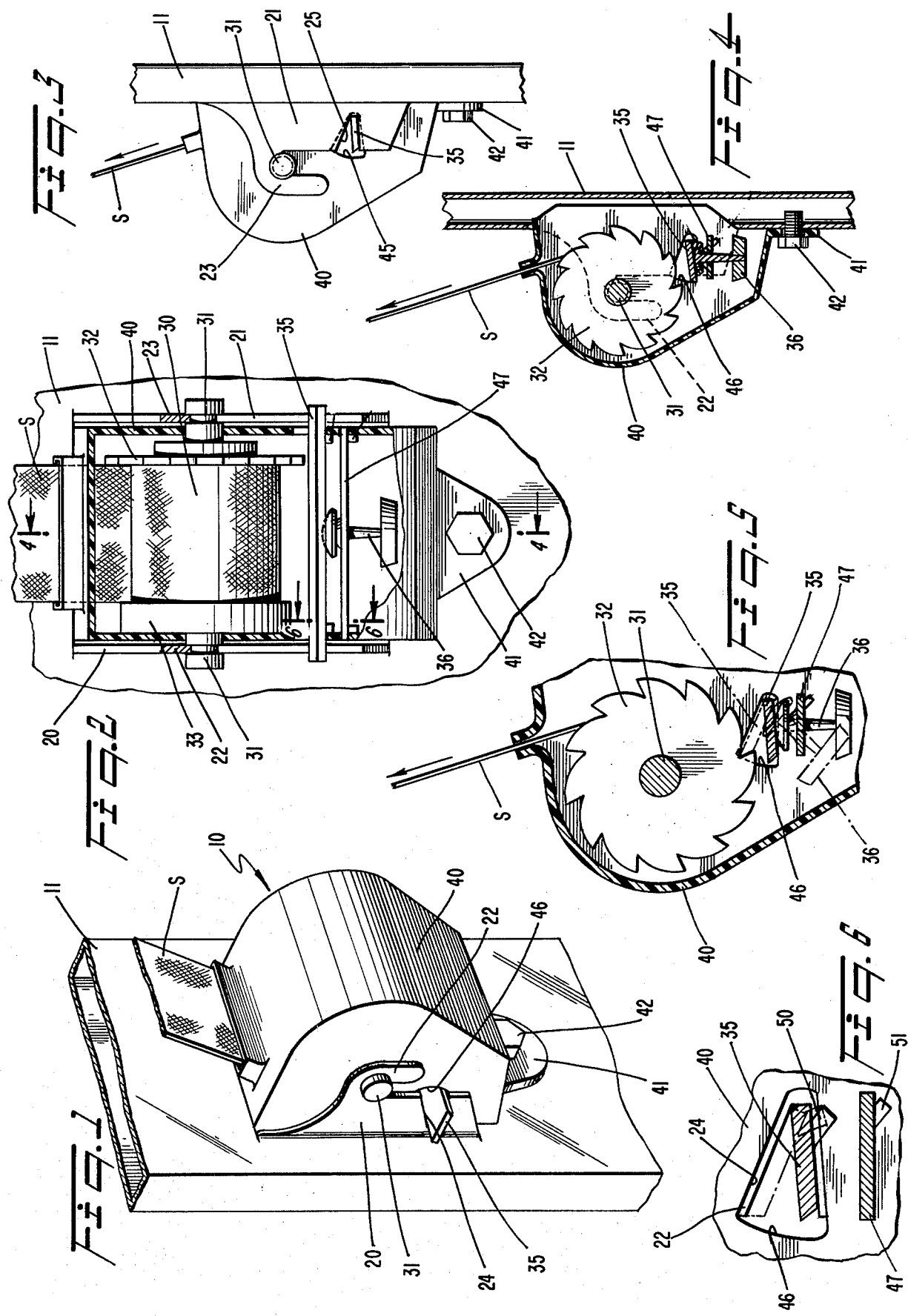

SAFETY BELT RETRACTOR ASSEMBLY UTILIZING VEHICLE STRUCTURE

FIELD OF THE INVENTION

The present invention relates to safety belt retractor assemblies, and more particularly, to an improved manner of mounting a retractor assembly on a structural support member of a vehicle.

BACKGROUND OF THE INVENTION

A widely-used safety belt retractor assembly comprises a reel which winds the belt by spring force to retract the belt when disconnected. A pendulum-actuated locking dog engages a ratchet wheel on the spool in the event of sudden acceleration of the vehicle in any direction. This provides lockup of the reel and secures the occupant in the vehicle so as to prevent or minimize injuries from second collision. This retractor assembly is typically mounted on the structural support column immediately behind the front door.

In the past, the safety belt retractor assembly has included its own U-shaped mounting frame for the spool and the locking mechanism. This U-shaped frame is typically made of a stamped metal piece and is provided with mounting means that engage the structural support member holding it in position. In most instances, a plastic cover is mounted over the entire retractor assembly for protection against dust and the like. One example of this prior art structure is shown in the Magyar U.S. Pat. No. 4,149,737, issued Apr. 17, 1979.

In vehicles being built today, it is of primary concern to reduce the weight of all components so as to improve the gasoline mileage of the vehicle. A savings of a few pounds of weight on several components of an automobile can provide significant dividends in increased mileage. Also generally, as weight is saved, such as by the elimination of unnecessary metal, the initial cost of the components can be reduced, thus providing significant benefit to the manufacturer and ultimately the consumer.

Thus, it is a object of the present invention to provide a safety belt retractor assembly that is integrated into the vehicle structure so as to provide a significant weight and cost saving.

It is another and related object of the present invention to provide a safety belt retractor assembly which utilizes integral raised flanges of a portion of the vehicle structure to directly receive the load caused by the restraining force of the belt during operation.

It is still another object of the present invention to provide the simplified safety belt retractor assembly which utilizes the cover for pre-locating the component parts for greater economy in the process of assembly and installation into the vehicle.

SUMMARY OF THE INVENTION

A safety belt retractor assembly is provided by the present invention wherein a separate load-bearing frame for the spool and locking mechanism is not required. In place of the separate frame, the present invention contemplates a pair of integral raised flanges on the vehicle support member to engage the support shaft for the retractor spool as well as the lock dog. The load caused by the restraining force of the belt is thus directly transmitted to these flanges. The flanges are preferably stamped out of the metal of the support member as the support member is formed during manufacture. A weight savings of up to 75% from the prior art structure is realized.

The shaft for the spool is specifically mounted by J-shaped anchors on the flanges whereas the ends of the lock dog are seated in suitable V-shaped cutouts. The lock dog is pivoted into engagement with a ratchet wheel on the spool by any suitable mechanism, such as a pendulum actuator. The pendulum actuator pivots the lock dog into engagement upon sudden deceleration of the vehicle.

The plastic cover that is provided over the retractor mechanism for protection against dust and for aesthetic purposes does not provide any load bearing function as a result of activation of the safety belt restraining system. However, the plastic cover does perform important location and pre-assembly functions for the components of the retractor assembly. Openings in the sides of the plastic cover locate the shaft, the lock dog which comprises a plate extending substantially parallel to the shaft and the support crosspiece for the pendulum actuator. Once assembled, the plastic cover and the parts can then be inserted between the raised flanges by a simple assembly operation. The lock dog and the pendulum actuator mounting crosspiece are positioned both during pre-assembly and during operation by retainer tabs engaging the inside of the cover.

DESCRIPTION OF THE DRAWINGS

These and other features and advantages of the invention are presented in the following detailed description of the preferred embodiment, taken in conjunction with the accompanying drawings, wherein:

FIG. 1 is a perspective view of the combination safety belt retractor assembly and the vehicle support member;

FIG. 2 is an enlarged plan view of the retractor assembly with the cover partially broken away for clarity of viewing of the internal parts;

FIG. 3 is a side view of the retractor assembly;

FIG. 4 is a cross-sectional view of the entire retractor assembly taken along line 4—4 of FIG. 2;

FIG. 5 is an enlarged partial cross-sectional view illustrating the operation of the locking mechanism of the retractor assembly; and FIG. 6 is an enlarged partial cross-sectional view taken along line 6—6 of FIG. 2 showing the mounting and retention of certain parts.

DETAILED DESCRIPTION OF THE PREFERRED EMBODIMENT

With reference now to FIG. 1 of the drawing, a safety belt retractor assembly 10 is shown mounted on a structural support member 11 of a vehicle. The structural support member 11 shown is contemplated as a fabricated steel box-like member, which is the typical construction for forming the center post of the side of the vehicle. This center post, sometimes referred to as a B-pillar, forms a convenient mounting with the retractor assembly being positioned close to the bottom of the post and just to the rear of the front door. A safety belt S emerges from the retractor assembly and extends upwardly along the post to a bracket (not shown) where the safety belt S is then directed down across the shoulder and across the chest of the occupant of the vehicle in a manner well known.

In accordance with the present invention, a pair of integral raised flanges 20, 21 are formed in the post or pillar 11 (see FIGS. 1 and 2). Preferably, these flanges 20, 21 are stamped from the metal forming the inside wall of the post 11 as the metal is fabricated. The flanges 20, 21 include J-shaped anchors 22, 23 (see FIGS. 1 and 3), respectively and V-shaped cutouts 24, 25, respectively. The J-shaped anchors 22, 23 and the cutouts 24, 25 directly receive the load caused by the restraining force of the belt that is transmitted from the occupant in the event of lockup of the retractor assembly. Because of this direct transmission of the force to the flanges 20, 21 integral with the structural support member 11, the separate frame that was previously required for a safety belt retractor has been eliminated. The specific manner in which this desirable result is accomplished and leading to other desirable results and advantages of the present invention will now be described.

First, with reference to FIG. 2, spool 30 upon which the safety belt S is wound is shown along with shaft 31 extending from both sides. The shaft 31 is held captive within the J-shaped anchors 22, 23 adjacent the ends of the spool. A ratchet wheel 32 is mounted on one side of the spool 30 and this forms a part of the locking mechanism to be described. On the other side of the spool can be mounted a windup spring, which is hidden by spring enclosure 33 (FIG. 2).

Cradled within the V-shaped cutouts 24, 25 in the flanges 20, 21, respectively, is lock dog 35, which comprises an elongated, rectangular plate extending across the width of the retractor assembly generally parallel to the axis of the spool shaft 31. The free edge of the lock dog 35 is tapered, so as to be adapted to engage the teeth of the ratchet wheel 32, as best shown in FIGS. 4 and 5. The lock dog 35 freely pivots about the crotch area of the cutouts 24, 25 for movement between the disengaged position (full line outline in FIG. 5) and the engaged position engaging one of the teeth (dotted line position). This movement can be caused by any suitable activator, such as the pendulum actuator 36 shown in these figures (note corresponding full line and dotted line positions in FIG. 5).

A brief review of the operation of the safety belt retractor assembly for the present invention now reveals the manner in which the forces generated by lockup of the assembly are uniquely directly transmitted to the flanges 20, 21. When the pendulum 36 swings to the dotted line position, the lock dog 35 is raised to the dotted line position and at the same time the safety belt S will be pulled upwardly by the force of the occupant against the belt. The spool 30 and the ratchet 32 rotate in the direction of the arrow in FIG. 5 until the next tooth engages the lock dog 35. The full stopping force of the lock dog 35 against the ratchet wheel 32 is then borne by the crotch area of the V-shaped openings 24, 25 (see FIGS. 1 and 5). In a like manner, the J-shaped anchors 22, 23 restrain the resultant tendency of the shaft 31 to move upwardly in the direction of the safety belt S. In this manner, it will be seen that the direct transmission of force generated as a result of the load on the belt is directly borne by the flanges 20, 21 that are integral with the vehicle support member 11. In essence, no emergency loading is necessary to be borne by any other part of the retractor assembly 10 which is mounted between the flanges 20, 21.

A plastic cover 40 is provided to protect the parts of the retractor assembly and to hide the parts from view, thus improving the aesthetics of the interior of the vehicle. A simple hold-down or positioning tab 41 provided with a suitable bolt fastener 42 serves to ensure that the retractor assembly 10 is maintained in its proper position between the raised flanges 20, 21. It should be emphasized that the hold-down tab 41 is not subjected to the forces of the belt S during emergency situations, as described above, since these forces are all borne through the shaft 31 and the lock dog 35 directly to the flanges 20, 21.

As will be evident from the drawings, openings are provided in the cover 40 for the shaft 31 and the lock dog 35 as best shown in FIG. 2. Such an opening 45 is shown for one end of the lock dog 35 in FIGS. 3 and 6. This opening 45 generally corresponds to the V-shaped cutout and includes a semicircular portion adjacent the engagement edge of the lock dog. Corresponding opening 46 for the other end of the lock dog 35 can be seen in FIG. 1. These openings 45, 46 thus retain the lock dog 35 in position so that when the lock dog 35 is activated it will properly engage the ratchet wheel 32. Just below the openings 45, 46 are additional opening slots that serve to mount crosspiece 47 supporting the pendulum actuator 36. These openings can be best visualized in FIG. 2.

One significant advantage of the retractor assembly of the present invention is that all of the parts can be pre-assembled in the cover 40, where they are securely retained until the retractor assembly 10 is placed in its final mounted position between the raised flanges 20, 21. This feature greatly simplifies the manufacturing operation since the parts can be assembled and then delivered to the final assembly line of the vehicle where the assembly 10 is easily installed by sliding the shaft 31 into the groove along the J-shaped anchors 22, 23, pivoting the bottom of the cover 40 so as to engage the lock dog 35 in the V-shaped cutouts 24, 25 and finally securing the hold-down tab 41 by engagement of the fastener 42.

In this disclosure, there is shown and described only the preferred embodiment of the invention, but as aforementioned, it is to be understood that the invention is capable of other and different embodiments, and its several details are capable of various obvious modifications, all without departing from the inventive spirit thereof.

What is claimed is:

1. In the combination of a safety belt retractor assembly and a vehicle interior structural support member, the improvement comprising:

a rotatable retractor spool having a safety belt wound thereon, a support shaft extending through said spool to receive the load exerted on the belt due to occupant-induced forces, and locking means in said retractor assembly to lock said spool against rotation; and a pair of integral raised flanges on said interior support member adjacent with the ends of said spool for directly mounting said support shaft, whereby the load caused by the restraining force of the belt is transmitted directly to said structural support member from said shaft.

2. The combination of claim 1 wherein said locking means is directly supported by said flanges, whereby the load on the locking means upon lock-up is transmitted directly to said structural support member.

3. The combination of claim 2 wherein said locking means comprises a lock dog extending generally parallel to said spool and ratchet means on said spool for engagement by said lock dog, said lock dog being directly supported by said flanges, whereby the load caused by the restraining force of the belt is transmitted directly to said structural support member from said lock dog.

4. The combination of claim 3 wherein said flanges each include a J-shaped anchor engaging the ends of said shaft, and a V-shaped cutout engaging the ends of said lock dog to allow pivoting engagement and disengagement of said lock dog with said ratchet means.

5. The combination of claim 3 wherein said assembly further comprises a plastic cover, openings in the sides of said cover to receive and locate the ends of said shaft and said lock dog, whereby preassembly prior to mounting on said flanges is possible.

6. The combination of claim 5 wherein said locking means further comprises a pendulum actuator for activating said lock dog upon sensing sudden acceleration of the vehicle, and a crosspiece for mounting said pendulum, openings in the sides of said cover to receive and locate the ends of said crosspiece.

7. The combination of claim 5 wherein said interior structural support member comprises the B-pillar of said vehicle.

8. The combination of claim 1 including a cover for said retractor assembly, said ends of said shaft extending through said cover to said flanges.

9. The combination of claim 8 wherein said cover comprises a positioning tab for positioning said assembly on said structural member.

10. The combination of claim 1 wherein each of said flanges includes a J-shaped anchor engaging the ends of said shaft.

11. A seat belt retractor assembly adapted for mounting in load transfer relationship on an interior structural support member of a vehicle, said support member having a pair of integral raised flanges, said seat belt retractor assembly comprising:
 a housing for said assembly, said housing having two opposing sides and openings in each of said sides;
 a rotatable retractor spool having a seat belt wound thereon, a support shaft having opposing ends extending through said spool and through and beyond said openings in each of said sides of said housing, said shaft receiving loads exerted on said belt due to occupant-induced forces, said opposing ends of said shaft adapted to be received in said integral flanges of said support member, whereby a load exerted on said belt is transmitted directly to said structural support member from said shaft; and
 locking means in said housing for locking said spool against rotation.

12. The seat belt retractor assembly of claim 11 wherein said housing is a plastic housing.

13. The seat belt retractor of claim 12 wherein said locking means comprises a lock dog, said lock dog having ends extending through additional openings in said sides of said housing, said ends of said lock dog being adapted to be directly supported by said flanges of said interior structural support member.

14. The seat belt retractor assembly of claim 13 including a positioning tab on said housing for positioning said housing on said structural support member.

* * * * *